(12) United States Patent
Marek

(10) Patent No.: US 9,578,864 B2
(45) Date of Patent: Feb. 28, 2017

(54) FISHING LURE ORGANIZER AND TACKLE BOX SYSTEM

(71) Applicant: Robert George Marek, Chicago, IL (US)

(72) Inventor: Robert George Marek, Chicago, IL (US)

( * ) Notice: Subject to any disclaimer, the term of this patent is extended or adjusted under 35 U.S.C. 154(b) by 274 days.

(21) Appl. No.: 14/047,357

(22) Filed: Oct. 7, 2013

(65) Prior Publication Data
US 2015/0096221 A1   Apr. 9, 2015

(51) Int. Cl.
*A01K 97/06*   (2006.01)

(52) U.S. Cl.
CPC ..................... *A01K 97/06* (2013.01)

(58) Field of Classification Search
CPC ........................................ A01K 97/06
USPC .... 43/54.1, 57.1; 206/315.11, 6.1, 380, 382, 206/383; 224/920; 211/85.2
See application file for complete search history.

(56) References Cited

U.S. PATENT DOCUMENTS

| | | | | |
|---|---|---|---|---|
| 1,543,120 A * | 6/1925 | Mathias | ................. | A01K 97/06 43/57.1 |
| 1,900,035 A * | 3/1933 | Beck | ...................... | A01K 97/06 43/57.1 |
| 2,164,259 A * | 6/1939 | Schweigert | ............ | A01K 97/06 43/57.1 |
| 2,447,105 A * | 8/1948 | Vogel | ..................... | A01K 97/06 206/315.11 |
| 2,497,188 A * | 2/1950 | Schindler | ............... | A01K 97/06 43/57.1 |
| 2,710,484 A * | 6/1955 | McGinnis | .............. | A01K 97/06 206/315.11 |
| 3,122,855 A * | 3/1964 | Collier | .................... | A01K 97/06 43/57.2 |
| 3,332,164 A * | 7/1967 | Parrett, Jr. | ............. | A01K 97/06 43/57.1 |
| 3,377,736 A * | 4/1968 | Woolworth | ............ | A01K 97/06 43/57.1 |

(Continued)

FOREIGN PATENT DOCUMENTS

| | | | | |
|---|---|---|---|---|
| DE | 3527214 A1 * | 2/1986 | ............. | A01K 97/06 |
| FR | 2444404 A1 * | 7/1980 | ............. | A01K 97/06 |

(Continued)

OTHER PUBLICATIONS

English Translation for Japanese Pat. No. 2012-115198.*
English Translation for French Pat. No. 2,444,404.*

*Primary Examiner* — Darren W Ark
(74) *Attorney, Agent, or Firm* — Bishop Diehl & Lee, Ltd.

(57) ABSTRACT

A fishing tackle organizer, usable alone or with a tackle box system, provides convenient storage and display of fishing tackle. The organizer includes an elongated body having a plurality of sites for securing tackle, and a back surface with means for securing the organizer to a desired structure, such as, for example, in a tackle box, on a boat, a fishing dock or in a garage. Each of the plurality of sites includes a hole in the elongated body and may include either a surface slot extending from the hole or a recessed upper surface to allow tackle to sit securely within the organizer. A door panel may also be provided to close over the body to retain tackle within the holes. The tackle box system is customizable and may include at least one of the disclosed organizers fixed or detachably positioned within a closable container.

10 Claims, 17 Drawing Sheets

(56) References Cited

U.S. PATENT DOCUMENTS

| | | | | |
|---|---|---|---|---|
| 3,512,295 A * | 5/1970 | Barge | A01K 97/06 43/57.1 |
| 3,739,518 A * | 6/1973 | Ziegler | A01K 97/06 206/315.11 |
| 3,775,895 A * | 12/1973 | Jachim | A01K 97/06 43/54.1 |
| 3,858,345 A * | 1/1975 | Ziegler | A01K 97/06 43/57.1 |
| 3,859,747 A * | 1/1975 | Proebstle | A01K 97/06 43/54.1 |
| 4,006,553 A * | 2/1977 | Porter | A01K 97/06 206/315.11 |
| 4,073,085 A * | 2/1978 | Stremeckus | A01K 97/06 43/54.1 |
| 4,208,825 A * | 6/1980 | Barnes | A01K 97/06 43/57.1 |
| 4,238,901 A * | 12/1980 | Martinet | A01K 97/06 43/57.1 |
| 4,245,422 A * | 1/1981 | Souza | A01K 97/06 206/315.11 |
| D262,132 S * | 12/1981 | McHugh | D22/134 |
| 4,604,822 A * | 8/1986 | Christenberry | A01K 97/06 206/315.11 |
| 4,631,856 A * | 12/1986 | Born | A01K 97/06 206/315.11 |
| 4,729,474 A * | 3/1988 | Lanius | A01K 97/06 206/315.1 |
| 4,742,640 A * | 5/1988 | Moore | A01K 97/06 43/57.1 |
| 4,769,941 A * | 9/1988 | Schmidt | A01K 97/06 43/57.1 |
| 4,770,327 A * | 9/1988 | Fortson | A01K 97/06 220/533 |
| D328,544 S * | 8/1992 | Salazar | D22/134 |
| 5,182,878 A * | 2/1993 | Clark | A01K 97/06 43/27.4 |
| 5,185,952 A * | 2/1993 | Bruce | A01K 97/06 43/57.1 |
| 5,392,557 A * | 2/1995 | Harmon | A01K 97/06 43/57.1 |
| 5,806,236 A * | 9/1998 | Lloyd | A01K 97/06 43/57.1 |
| D416,732 S * | 11/1999 | Hampshire | D6/552 |
| 5,983,556 A * | 11/1999 | Zaloga | A01K 97/06 211/105.1 |
| 6,009,660 A * | 1/2000 | Rice | A01K 97/06 206/315.11 |
| 6,782,654 B1 * | 8/2004 | Borchardt | A01K 97/06 211/13.1 |
| 7,043,871 B2 * | 5/2006 | Chapel | A01K 97/06 43/57.1 |
| 7,278,234 B2 | 10/2007 | Marino | |
| 7,299,584 B2 * | 11/2007 | Hoover | A01K 97/06 43/54.1 |
| 7,552,560 B2 * | 6/2009 | Hoover | A01K 97/06 206/315.11 |
| 7,621,074 B2 * | 11/2009 | Glidewell | A01K 97/06 43/57.1 |
| 7,654,033 B2 * | 2/2010 | Kuhn | A01K 97/06 43/54.1 |
| 7,997,024 B2 * | 8/2011 | Gesik | A01K 97/06 43/54.1 |
| 8,468,740 B1 | 6/2013 | Cryckman | |
| 2006/0191188 A1 * | 8/2006 | Peiser | A01K 97/06 43/54.1 |
| 2008/0134566 A1 * | 6/2008 | Greaves | A01K 97/06 43/57.1 |
| 2011/0214336 A1 | 9/2011 | Hoover | |

FOREIGN PATENT DOCUMENTS

| | | | | |
|---|---|---|---|---|
| FR | 2551320 A1 * | 3/1985 | | A01K 97/06 |
| FR | 2568449 A1 * | 2/1986 | | A01K 97/06 |
| GB | 619164 A * | 3/1949 | | A01K 97/06 |
| GB | 1259697 A * | 1/1972 | | A01K 97/06 |
| JP | 08214749 A * | 8/1996 | | |
| JP | 11009164 A * | 1/1999 | | |
| JP | 2003116435 A * | 4/2003 | | |
| JP | 2004065131 A * | 3/2004 | | |
| JP | 2005065584 A * | 3/2005 | | |
| JP | 2005192560 A * | 7/2005 | | |
| JP | 2005343564 A * | 12/2005 | | |
| JP | 2006141386 A * | 6/2006 | | |
| JP | 2006262747 A * | 10/2006 | | |
| JP | 2008074453 A * | 4/2008 | | |
| JP | 2012115198 A * | 6/2012 | | |
| WO | WO 9102457 A1 * | 3/1991 | | A01K 97/06 |
| WO | 2008032081 A2 | 3/2008 | | |

\* cited by examiner

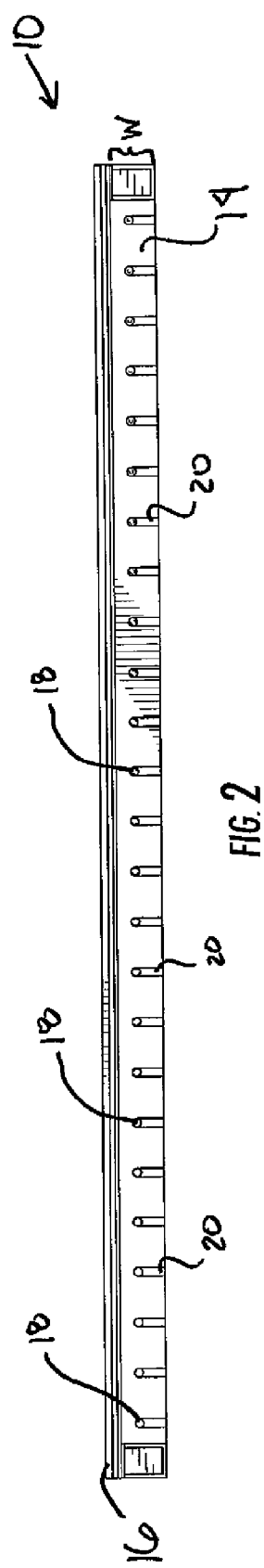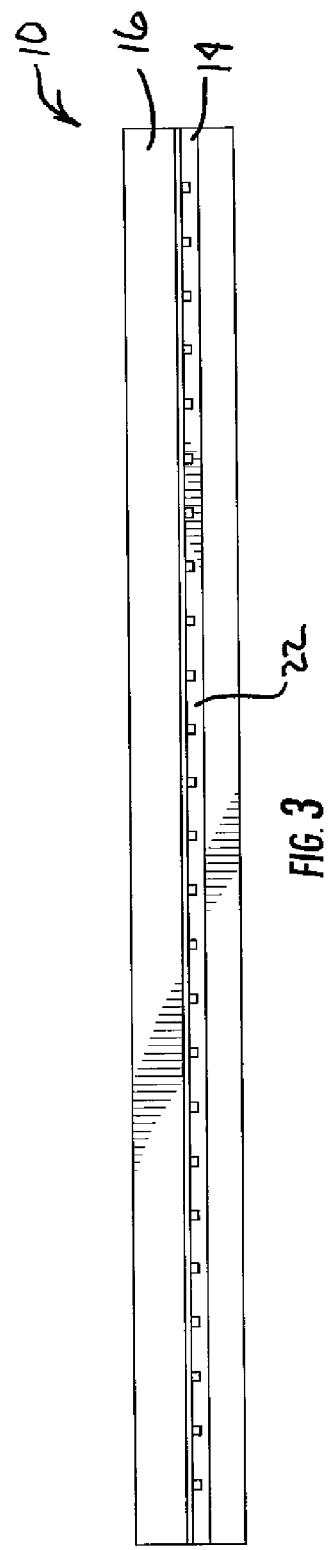

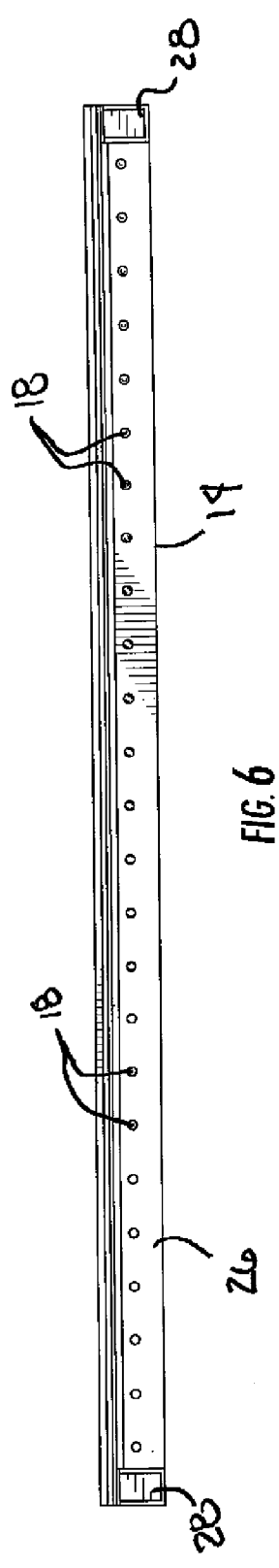
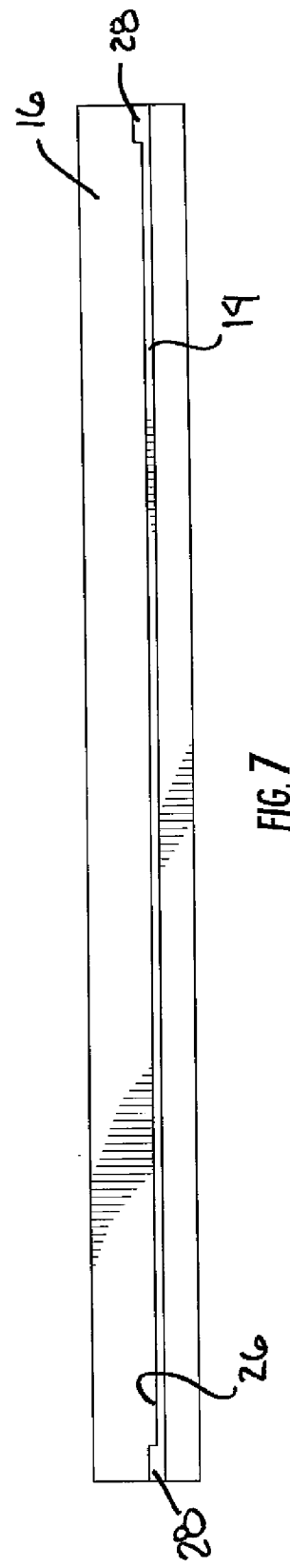
FIG. 6
FIG. 7

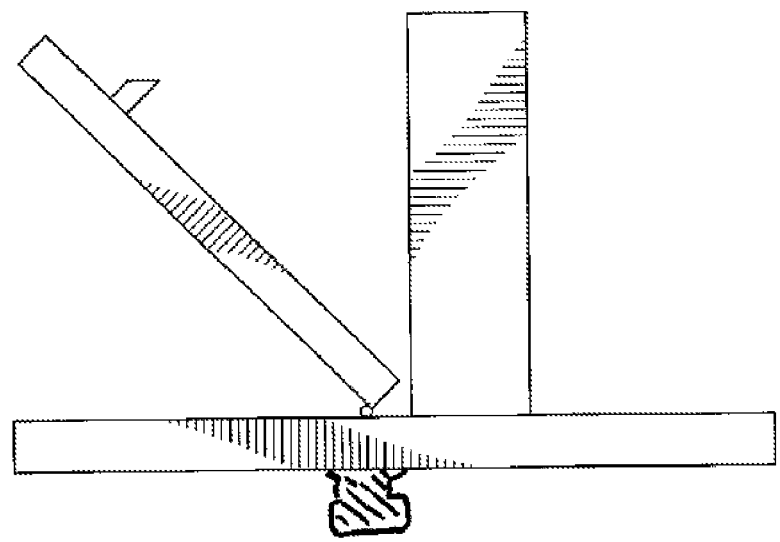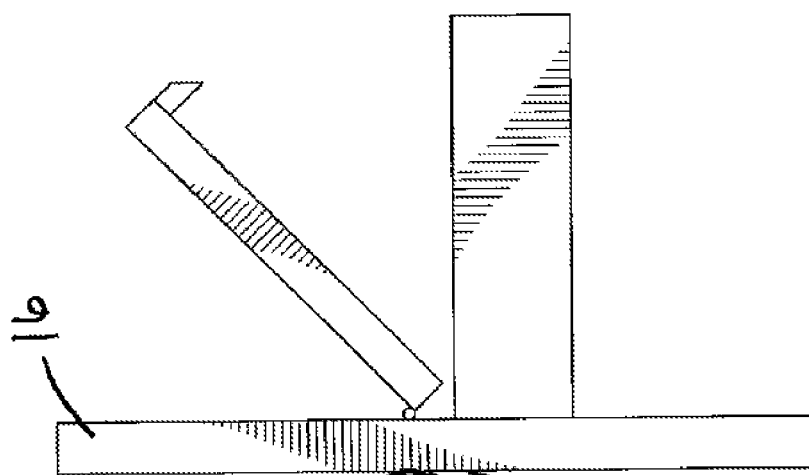
FIG. 15E
FIG. 15F

FISHING LURE ORGANIZER AND TACKLE BOX SYSTEM

TECHNICAL FIELD OF THE INVENTION

The present invention relates to organizers for fishing lures of all shapes and sizes, as well as a fishing tackle box system. More particularly, the invention relates to a customized organizer for lures and a customizable tackle box system.

BACKGROUND OF THE INVENTION

It is not uncommon for fisherman to own hundreds, even thousands of different fishing tackle, including lures, jigs, crankbait, bobbers, hooks, etc. Such fishing tackle is typically initially sorted and stored within multiple tackle boxes. With respect to fishing lures and crankbait, special shallow tackle boxes having dividers are used to help reduce an acceptable amount of tangling and chaos. Eventually, with the ever constant addition of new tackle, the tangle of multi-barbed hooks and neon colored bodies become too difficult, too common, and too much for even the most diligent fishermen. The result is a collection of tackle in complete disarray. Finding "just the right" lure becomes next to impossible.

Even for organized tackle boxes which allow for hanging of tackle, stability can be an issue which slows the selection process. For tournament fishermen, time can be a critical factor in competition. The need is not just for an organized tackle box, but for feature that allows the full complement of a fisherman's tackle to be accessible during fishing. A stable and accessible location for the display of tackle would greatly enhance the experience as well.

In addition to the organization and time issues, most fish tackle, fresh from dangling in water for some time, is put away and stored wet. This can lead to odor, rust and even tackle degradation for some materials. Current tackle storage bins and boxes, even while providing drainage holes or slots, do not facilitate proper drying of tackle.

By providing a unique customized organizer with multiple beneficial features, capable of use with and without a customizable tackle box, the utility, tackle access, stability and overall sanitation and life of the tackle, as well as the enjoyment of the fishing experience by the user, are greatly improved. Until the invention of the present application, these and other problems in the prior art went either unnoticed or unsolved by those skilled in the art. The present invention provides unique organization, storage and stability to any fishing trip without sacrificing portability features, design, style or affordability.

SUMMARY OF THE INVENTION

There are disclosed herein an improved tackle organizer and an improved tackle box system, both of which avoid the disadvantages of prior devices while affording additional structural and operating advantages.

Generally speaking, the disclosed tackle organizer is comprised of a first elongated body having a plurality of sites for securing tackle, and a back surface attached to the first body with means for securing the organizer to a desired structure, such as, for example, in a tackle box, on a boat, or in a garage.

In an embodiment, each of the plurality of sites includes a hole in the elongated body and a surface slot extending from the hole. This configuration allows tackle to sit securely within the organizer. A hinged door panel may also be provided to close over the elongated body to retain the tackle within the holes and slots.

In a customizable tackle box system, a plurality of the disclosed organizers are positioned within a closable container. The container preferably has a substantially open base portion and a complementary lid or top portion, with the plurality of organizers being secured to an inner surface of the lid or top portion. The container also comprises support for preventing the container from tipping over when open. The support may include leg supports attached to the lid or top portion and/or a counter-weight within the base portion.

In specific embodiments, the container may further include drainage openings defined in the base. The inside surface of the base may be angled to promote drainage as well.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings, embodiments thereof, from an inspection of which, when considered in connection with the following description, the subject matter sought to be protected, its construction and operation, and many of its advantages should be readily understood and appreciated.

FIG. 2 is a top plan view of the organizer of FIG. 1;

FIG. 3 is front plan view of the organizer of FIG. 1;

FIG. 6 is top plan view of the organizer of FIG. 5;

FIG. 7 is front plan view of the organizer of FIG. 5;

FIGS. 15A-15F are side views of an organizer showing a few possible embodiments of detachable mechanisms.

DETAILED DESCRIPTION OF THE INVENTION

Figure 1A:
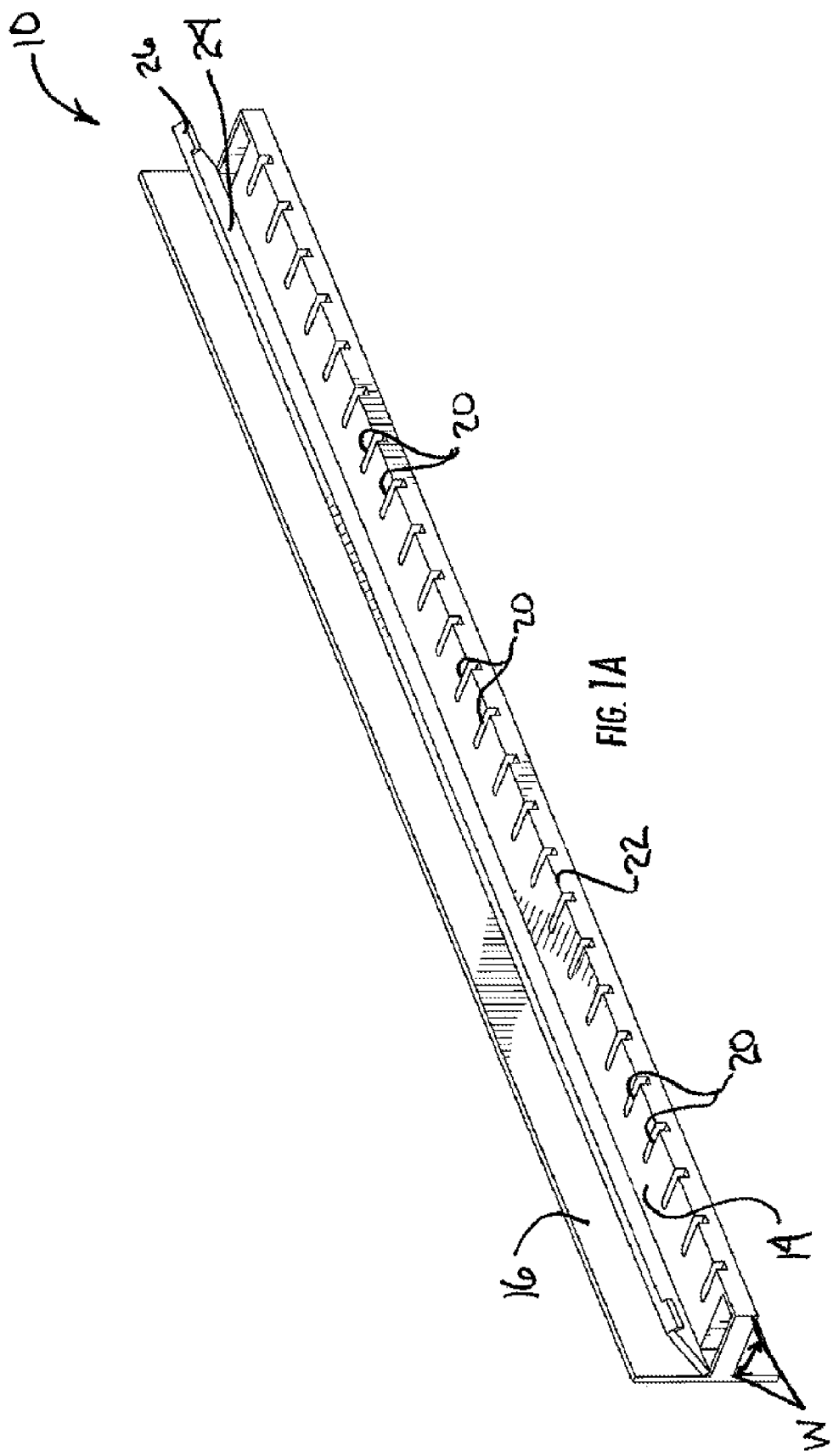
FIG. 1A is perspective view of an embodiment of the disclosed tackle organizer.

While this invention is susceptible of embodiments in many different forms, there is shown in the drawings and will herein be described in detail at least one preferred embodiment of the invention with the understanding that the present disclosure is to be considered as an exemplification of the principles of the invention and is not intended to limit the broad aspect of the invention to any of the specific embodiments illustrated.

Referring to FIGS. 1-15, there are illustrated several embodiments of a fishing tackle organizer and a fishing tackle box system. The organizer, generally designated by the numeral 10 (110 or 210), and tackle box system, generally designated by the numeral 12, are capable of including a number of unique features and components. Accordingly, while not all embodiments are shown or described as including all possible unique features and components, those skilled in the art would understand from the following description in conjunction with the appended drawings, the numerous combinations and variations possible. In all embodiments, similar features have been indicated using the same reference number in the drawings and the following

DETAILED DESCRIPTION

A key feature of the described organizer 10 is that it can be customized to a specific tackle considering dimensions such as size and shape. A key feature of the tackle box system 12 is that it can be personally customized by the user for the various tackle which is to be stored therein. Other features of the organizer and tackle box system 12 will be apparent from the various embodiments described.

Figure 8:
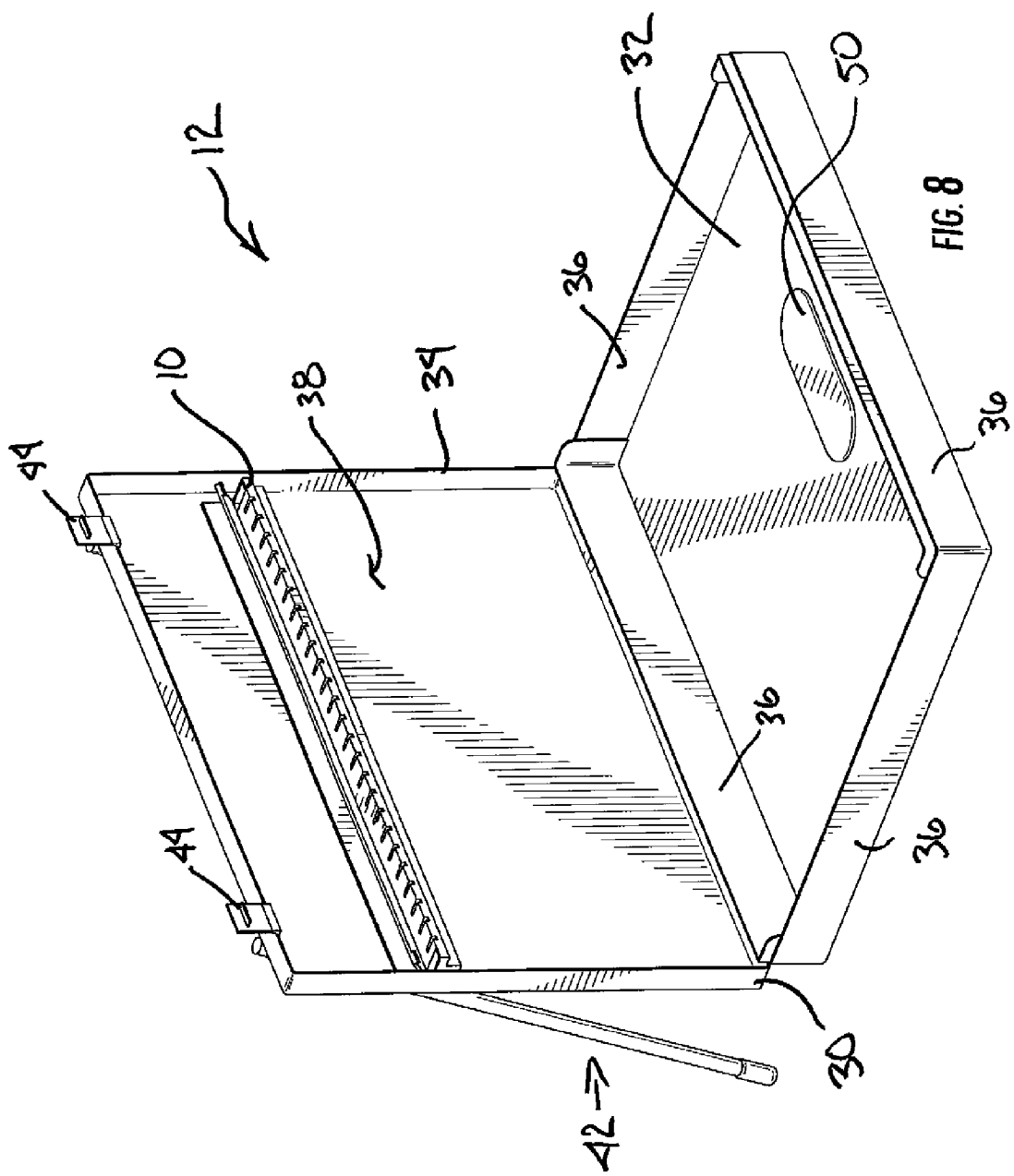
FIG. 8 is perspective view of an embodiment of the disclosed tackle box system in an open configuration.
Figure 9:
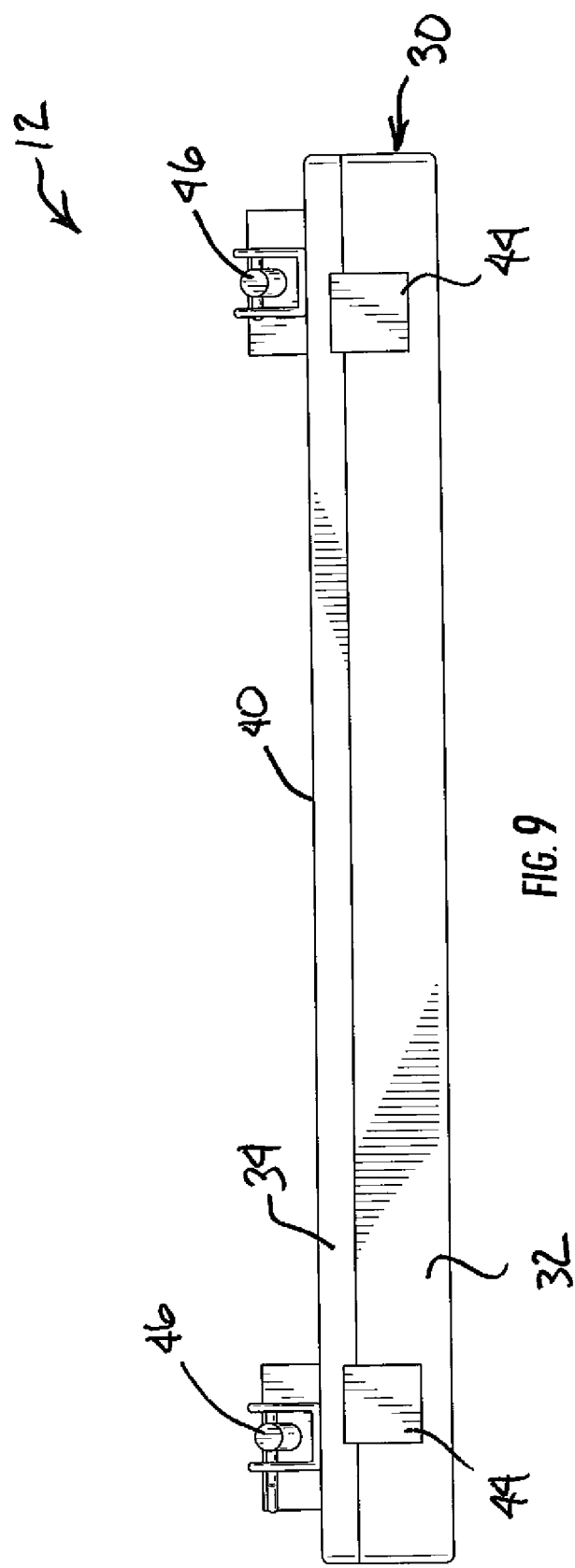
FIG. 9 is a front plan view of the embodiment of FIG. 8 in a closed configuration.
Figure 10:
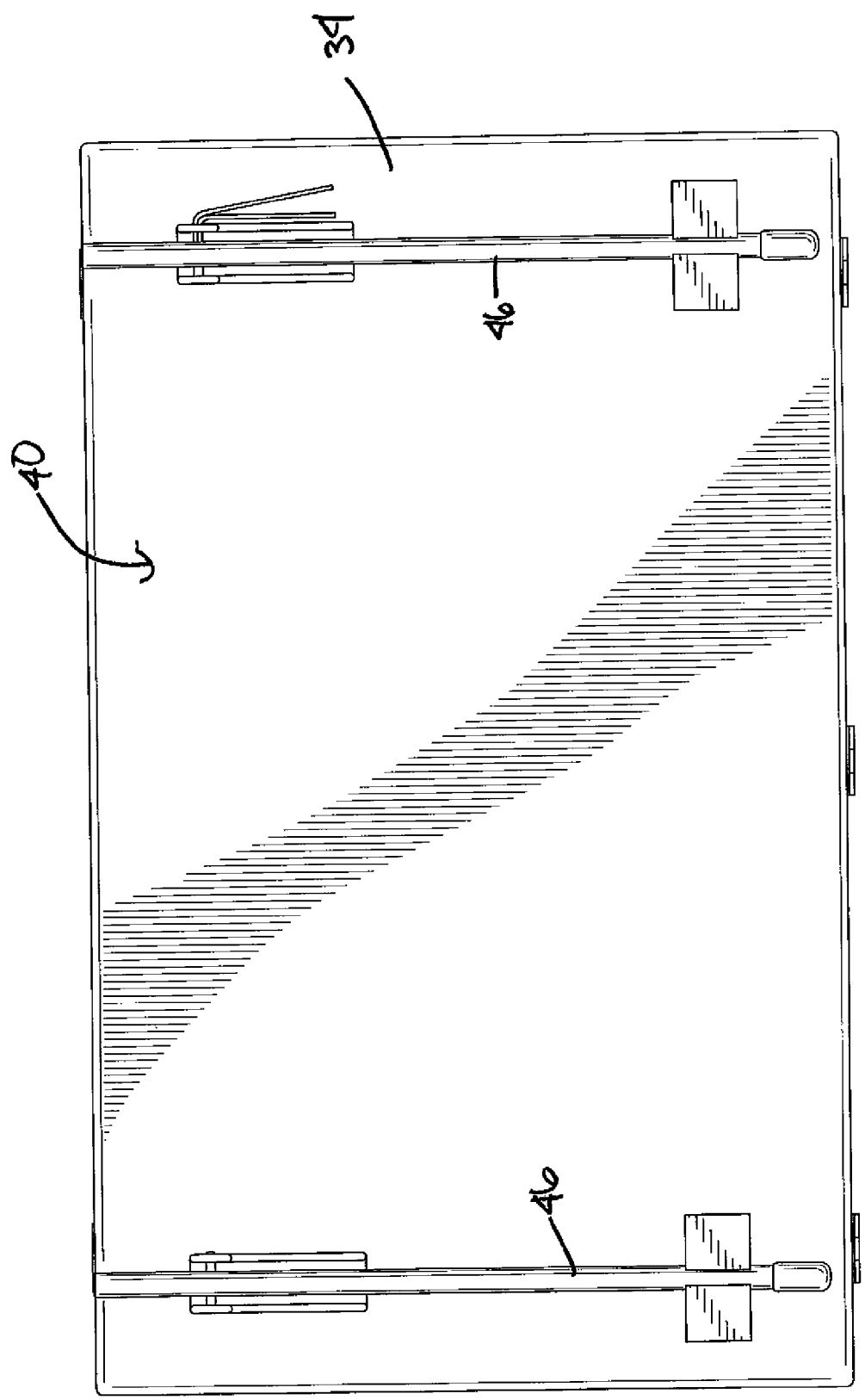
FIG. 10 is a top plan view of the embodiment and configuration of FIG. 9.
Figure 11:
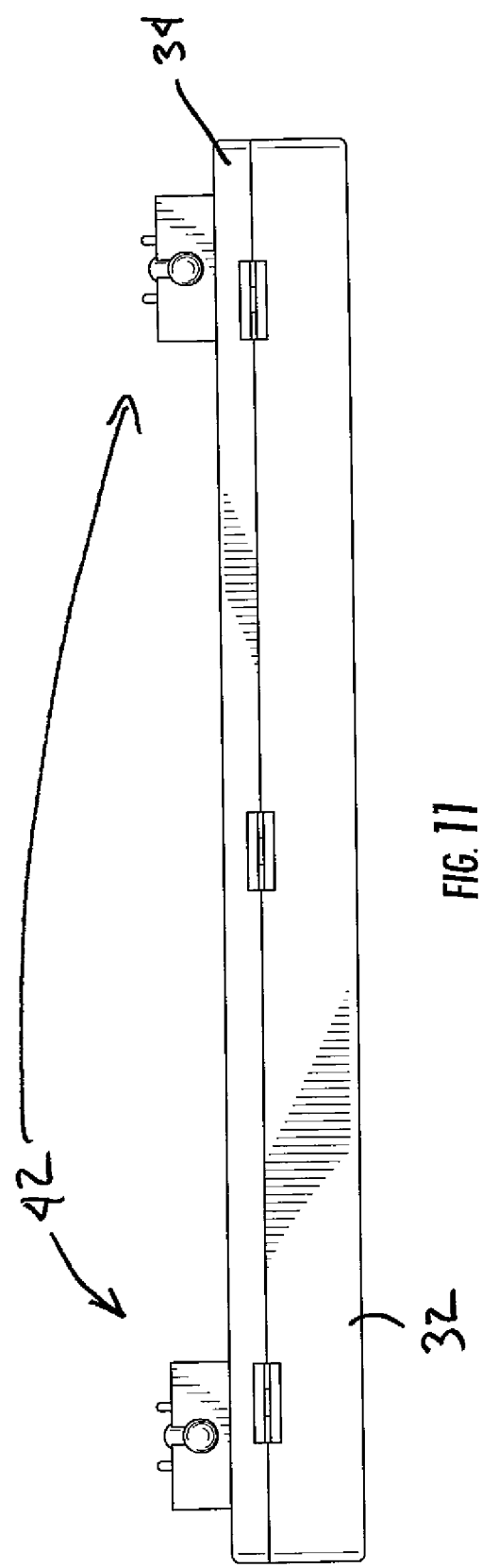
FIG. 11 is a back plan view of the embodiment and configuration of FIG. 9.
Figure 12:
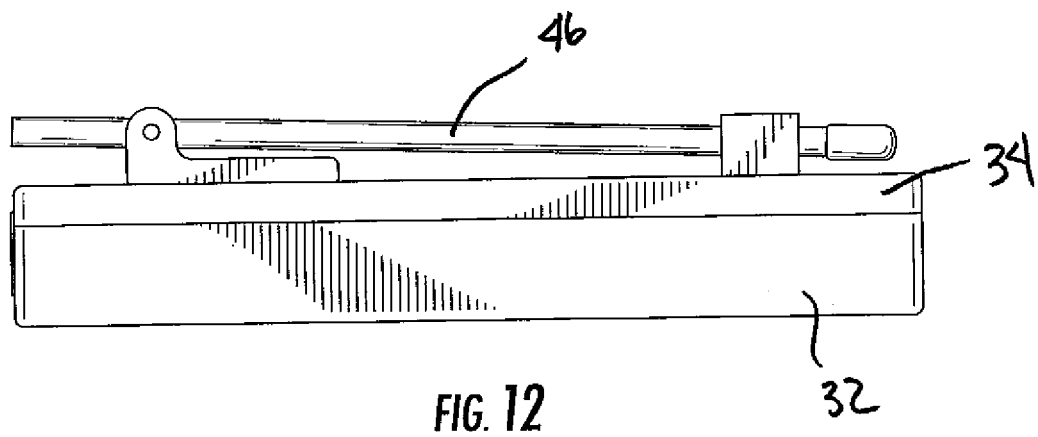
FIG. 12 is a right side plan view of the embodiment and configuration of FIG. 9.
Figure 13:
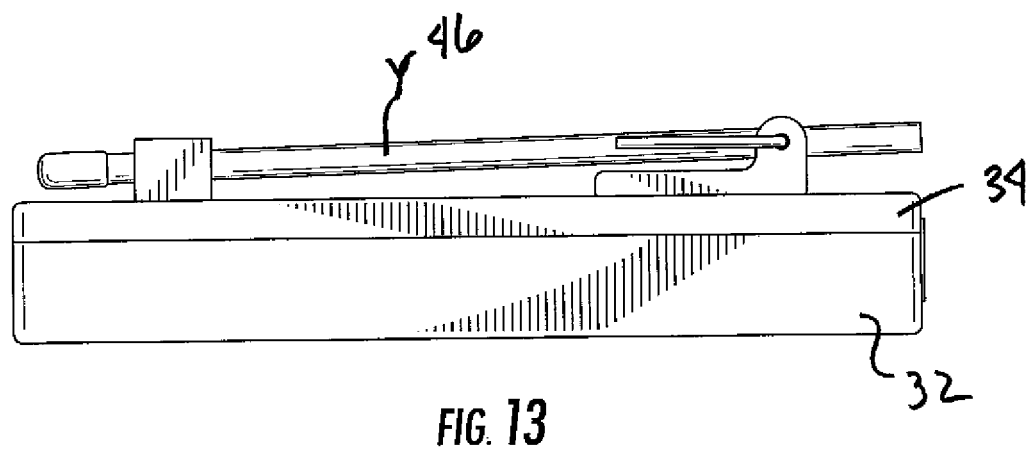
FIG. 13 is a left side plan view of the embodiment and configuration of FIG. 9.

Further, while the system 12 includes a container 30, the particular illustrated container 30 of FIG. 8, for the storage of what is known in the industry as "crankbait," is not intended to limit the scope of the claims to just such a tackle box container. In fact, while all the embodiments illustrated are directed to a container for such fishing tackle, it should be understood that the principles of the invention can be more broadly applied to a storage container for most any type of hooked fishing tackle, as long as such tackle is suitable for securing in an embodiment of the disclosed customized organizer 10.

Beginning with the embodiment of the organizer 10 illustrated in FIGS. 1A, 2 and 3, several features and benefits can be more readily understood. The organizer 10 is preferably comprised of an elongated body 14 attached to a back surface 16. The elongated body 14 includes a plurality of holes 18 passing through the body 14 and a surface slot (or channel) 20 extending from each hole 18 to a front edge 22 of the body 14. As can be seen, the slot 20 is not intended to go completely through the body, rather its depth is dependent upon the type of tackle (i.e., lure) to be positioned in the organizer 10. Likewise, the size, spacing and position (relative to the edge of the elongated body 14) of the holes 18 are to be customized for specific hooks used in the lures. For example, no. 2 hooks are small so the holes could be positioned closer to the edge 22 with minimal spacing between holes, while no. 10 hooks are larger and the holes would be positioned further from the edge 22 and spaced farther apart. Of course, the width (W) of the body 14 can be varied to accommodate hook sizes as well. Though not shown, it is possible that the organizer 10 can be provided with a range of hole positions and/or hole diameters to accommodate an assortment of hooks. Such an organizer 10 could benefit "novice" fisherman having a limited amount of tackle or an angler who wants to use only a limited number of various sized lures.

Figure 14B:
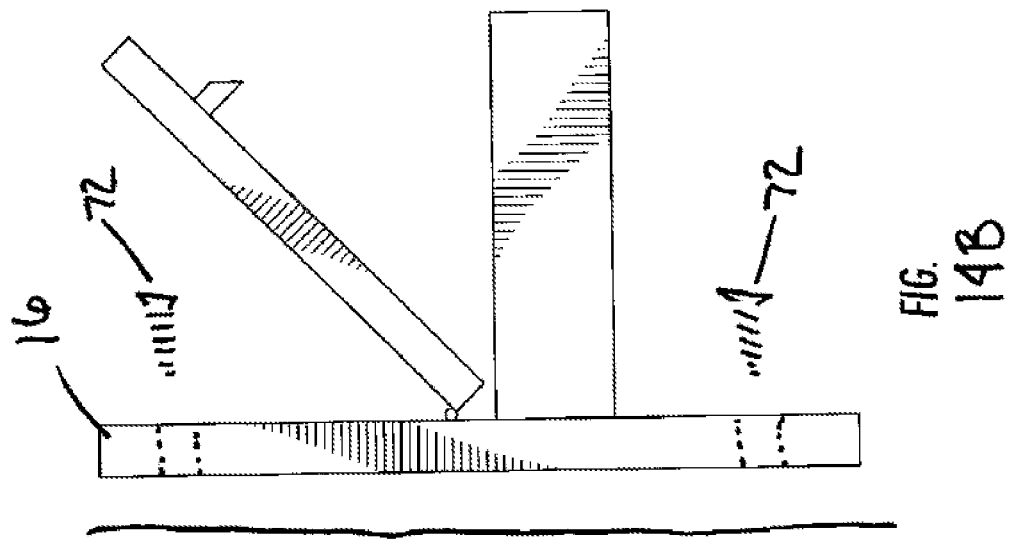
FIGS. 14A-14B are side views of an organizer showing just two embodiments of permanent attachment features.
Figure 14A:
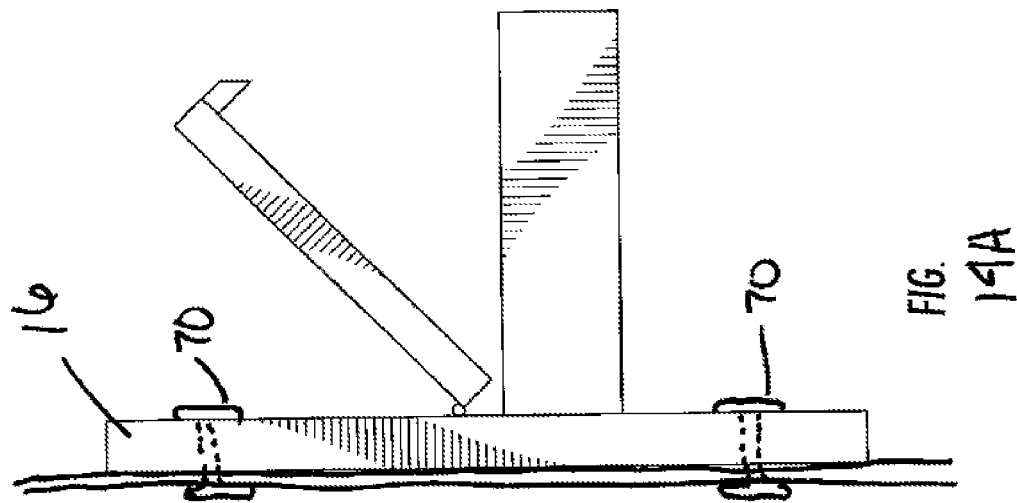
Figure 15B:
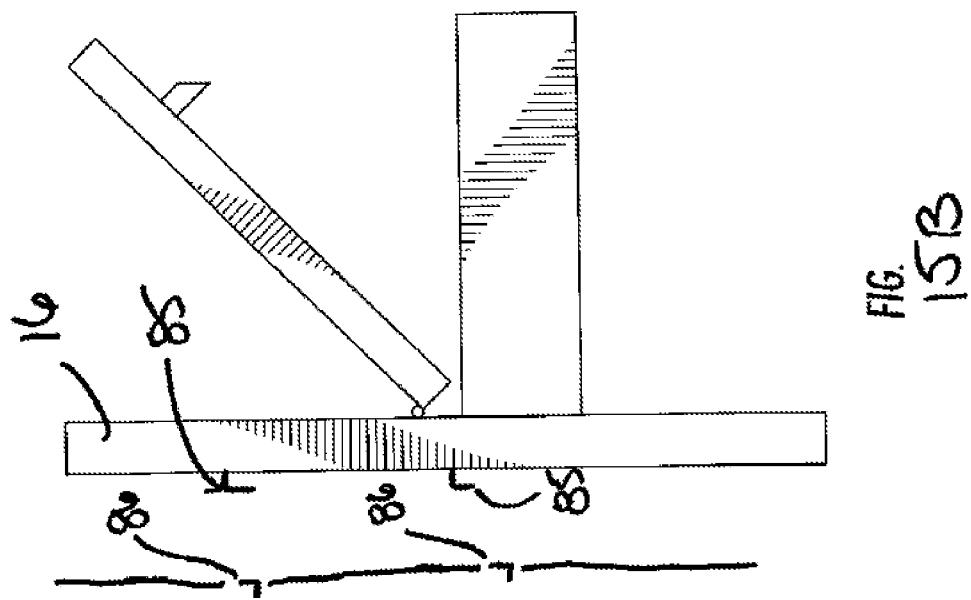
Figure 15A:
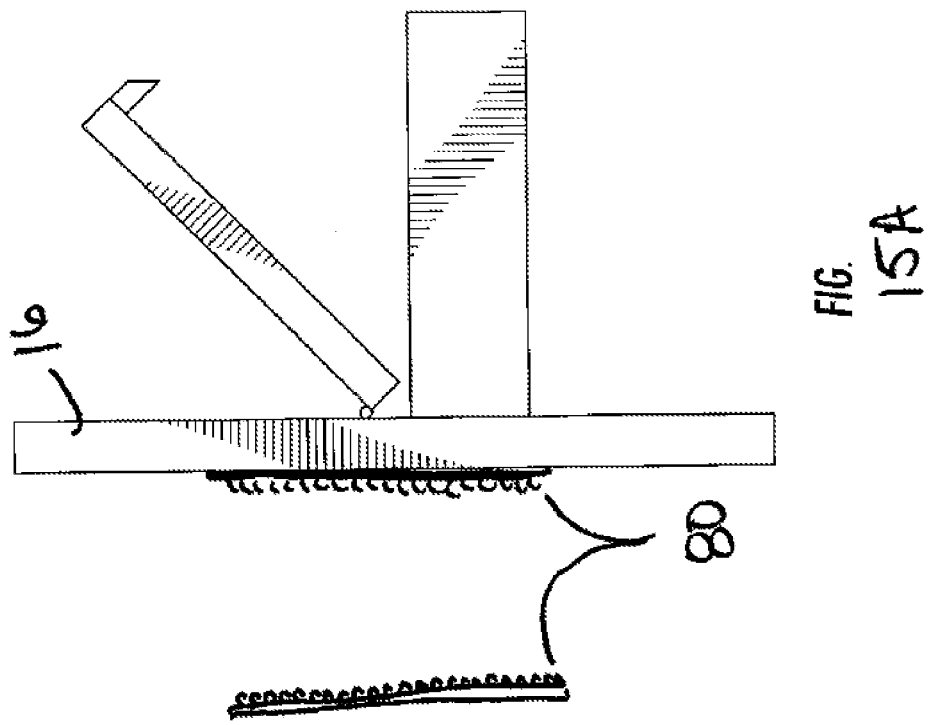
Figure 15D:
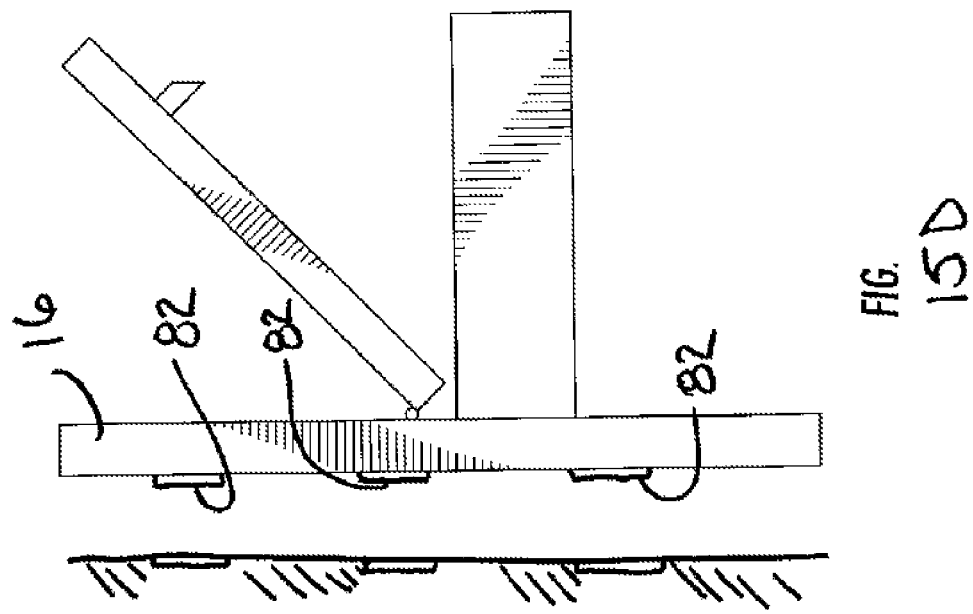
Figure 15C:
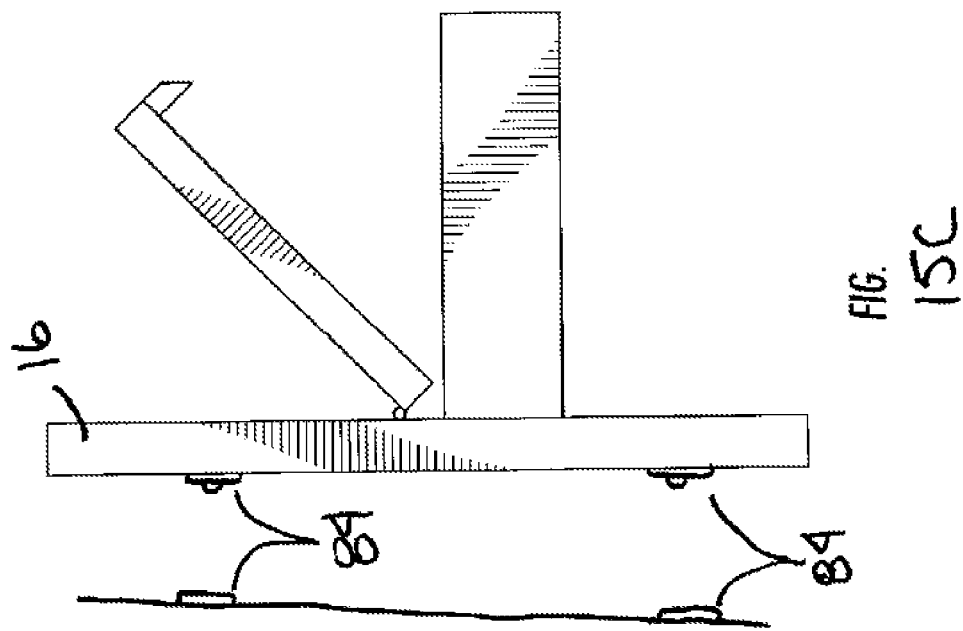

To that point, the disclosed organizer 10 includes a back surface 16 which allows it be secured to a structure, including within container 30 of the tackle box system 12 (see FIG. 8). The organizer 10 may be permanently attached using connectors such as rivets 70 (FIG. 14A) or screws 72 (FIG. 14B). Alternatively, the back surface 16 may include mechanisms which allow for detachable connections to a surface. For example, as shown in FIGS. 15A-15F, the organizer 10 may use hook-and-loop material (aka VELCRO®) 80, straps 81 to loop around a pole or tree, magnets 82 for attaching to metal surfaces, snaps 84, tabs 85 and slots 86, tongue and groove (FIG. 15F) or most any other type of reusable connectors known to those skilled in the art.

Figure 4A:
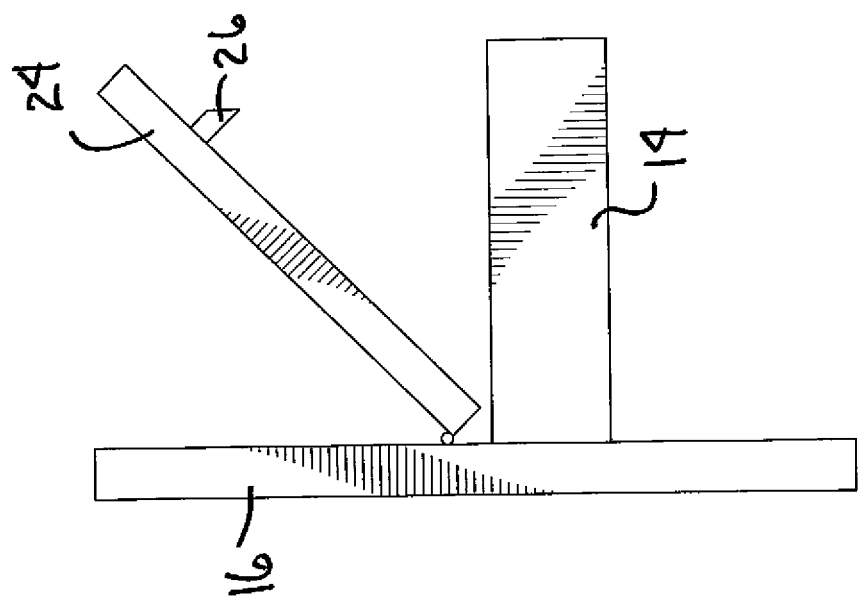
FIGS. 4A and 4C are side plan views of embodiments of the disclosed organizer with the door panel in an open position.
Figure 4B:
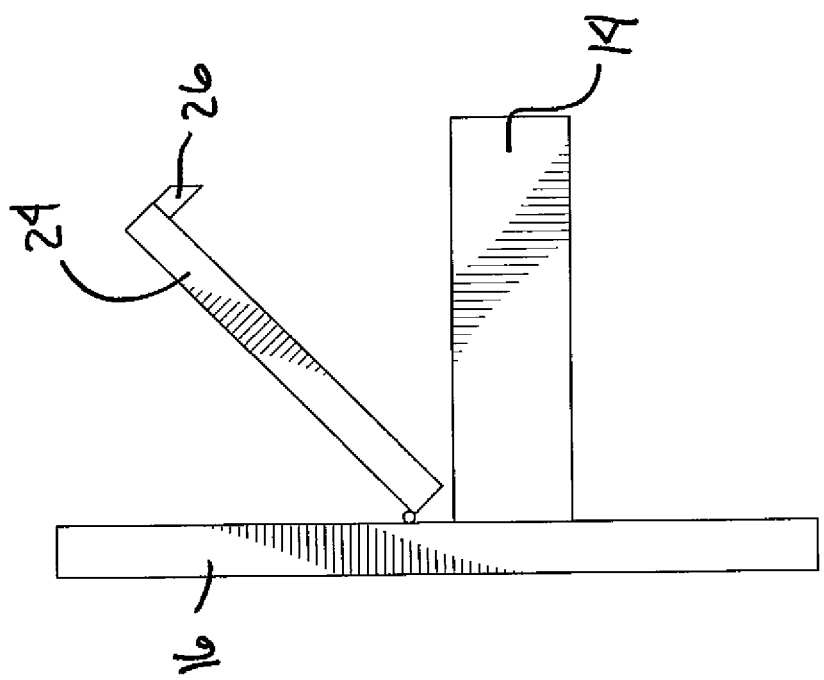
FIGS. 4B and 4D are side plan views of embodiments of the disclosed organizer with an extended door panel in an open position.
Figure 4D:
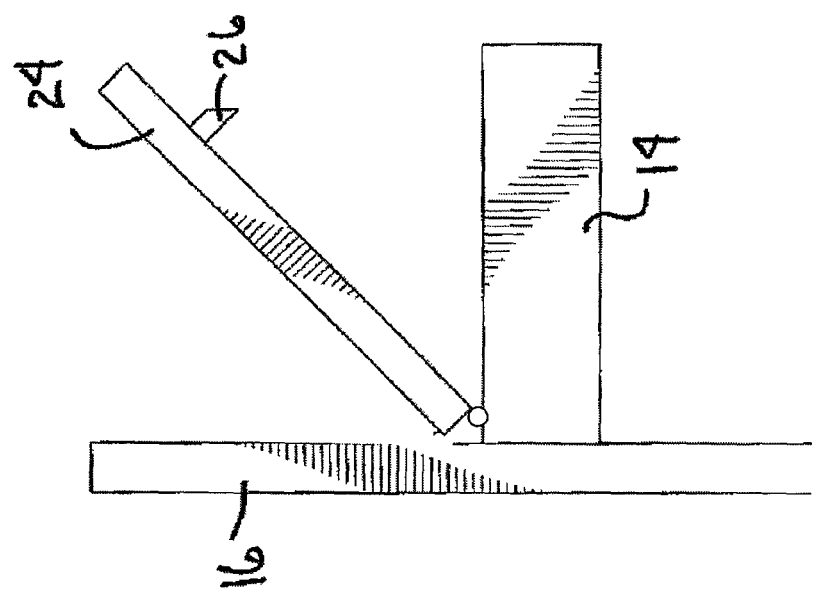
Figure 4C:
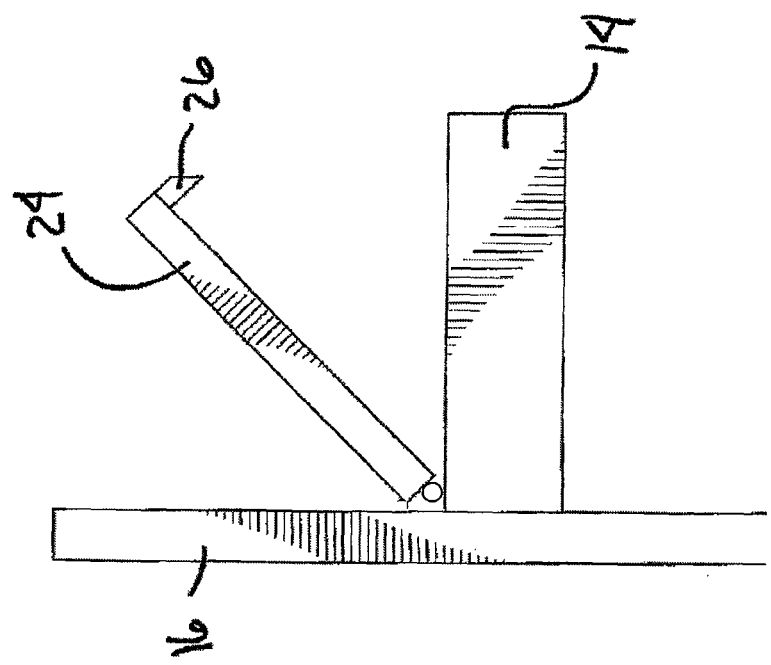

As shown, a door panel 24 is attached via a hinge (preferably a "living" hinge) at the junction of the elongated body 14 and the back surface 16. The door panel 24 closes over the elongated body 14 to hold in the various tackle when not in use. The door panel 24 prevents hooks from "jumping" out of the lure sites. The door panel 24 may include a biasing spring to maintain the panel in a closed position, and/or it may utilize some form of clip/snap mechanism 26 (see FIGS. 4A and 4C) to hold the panel 24 closed which comprise a male component. The door panel 24 may also be extended outward, as shown in FIGS. 4B and 4D, where larger hooks/lures are retained. Magnets can also be used to retain the door panel 24 in a closed position.

Figure 1B:
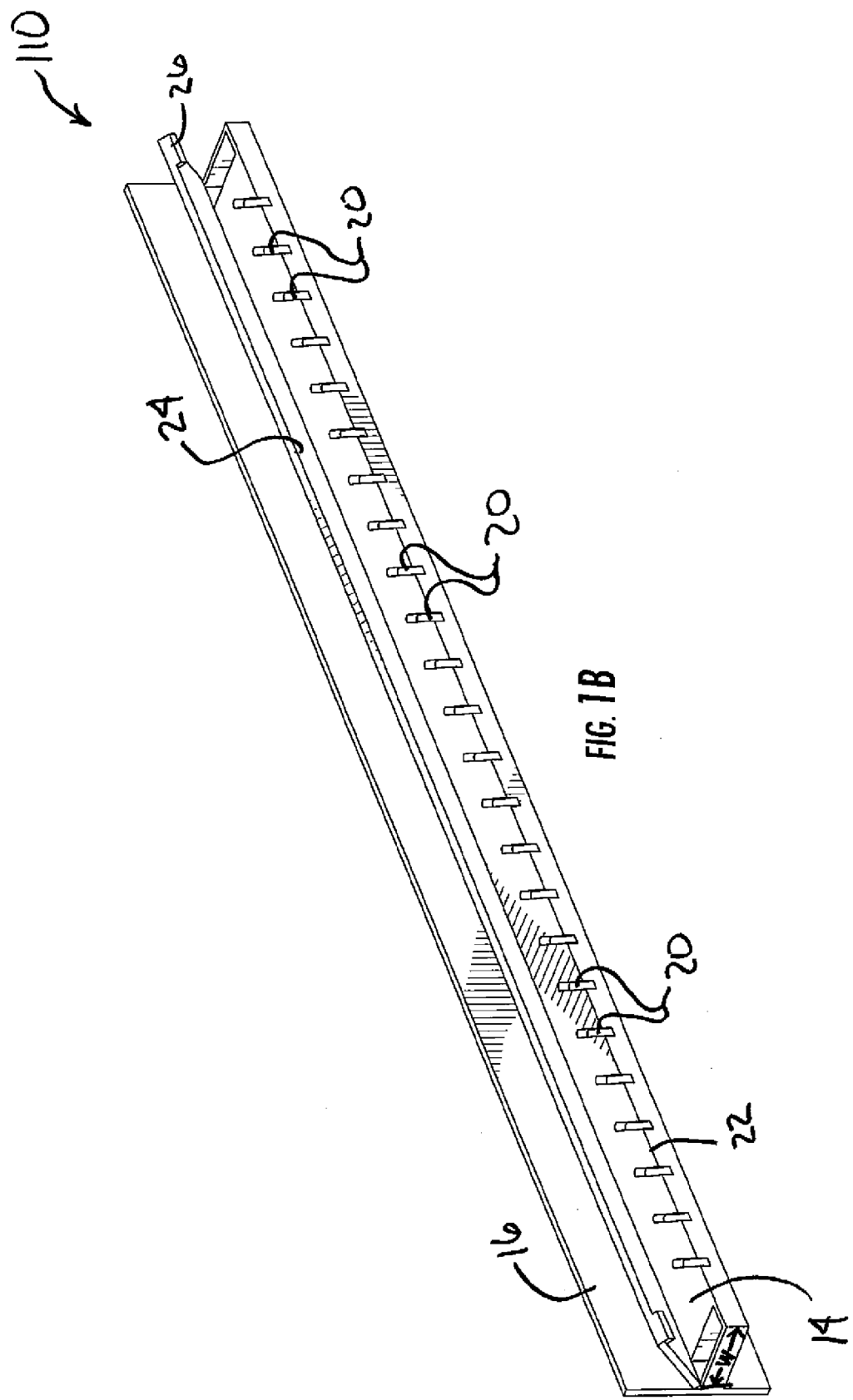
FIG. 1B is a perspective view of another embodiment of the disclosed tackle organizer.

Referring now to FIG. 1B, an alternate embodiment of organizer 110 is illustrated. In this embodiment, the slots/channels 20 may be placed at an angle to further inhibit lures from being undesirably dislodged. The angle for each site can alternate and should be in the range of about 10-45° off center.

Figure 5A:
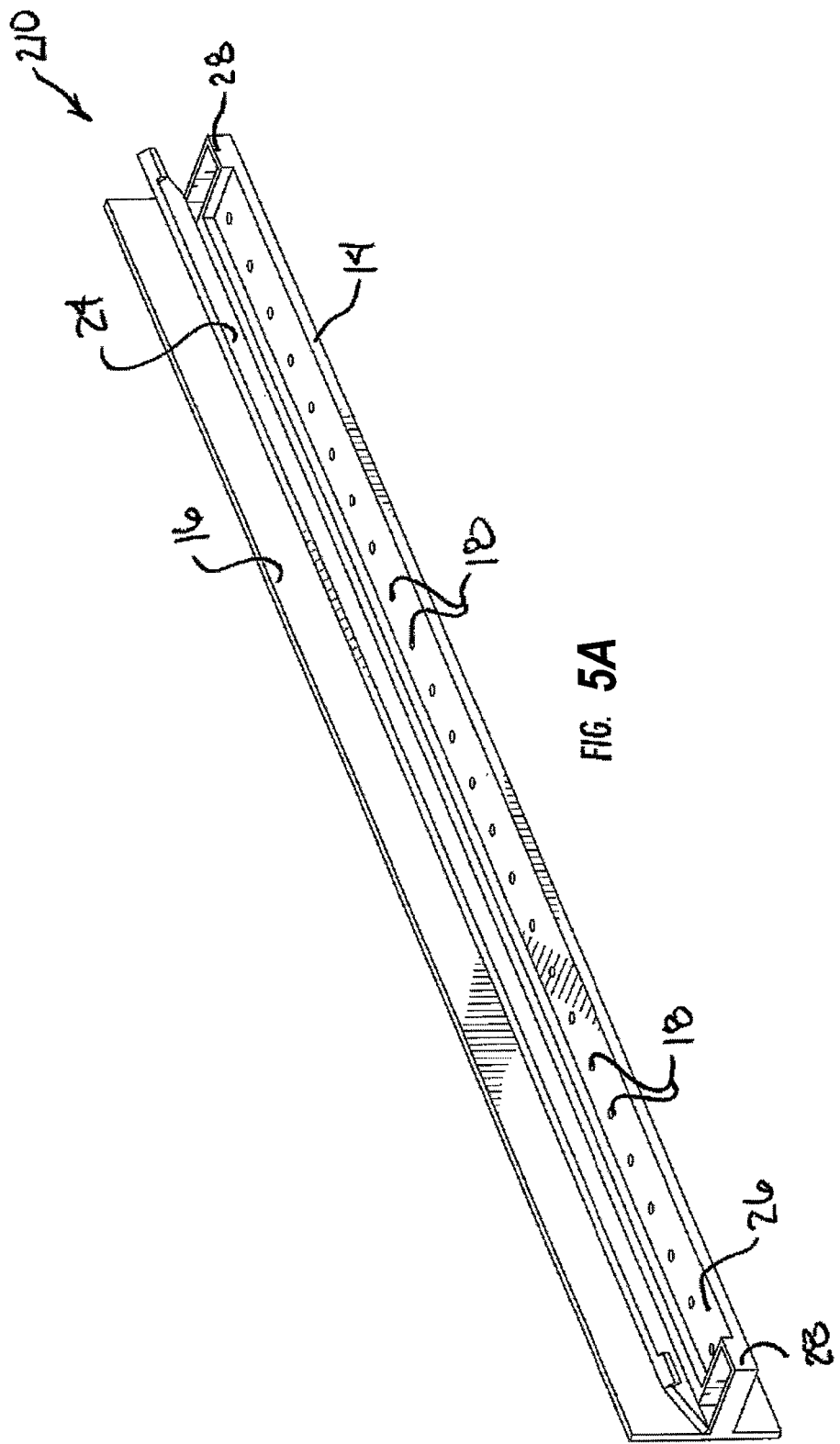
FIGS. 5A and 5B are perspective views of alternate embodiments of the disclosed organizer.
Figure 5B:
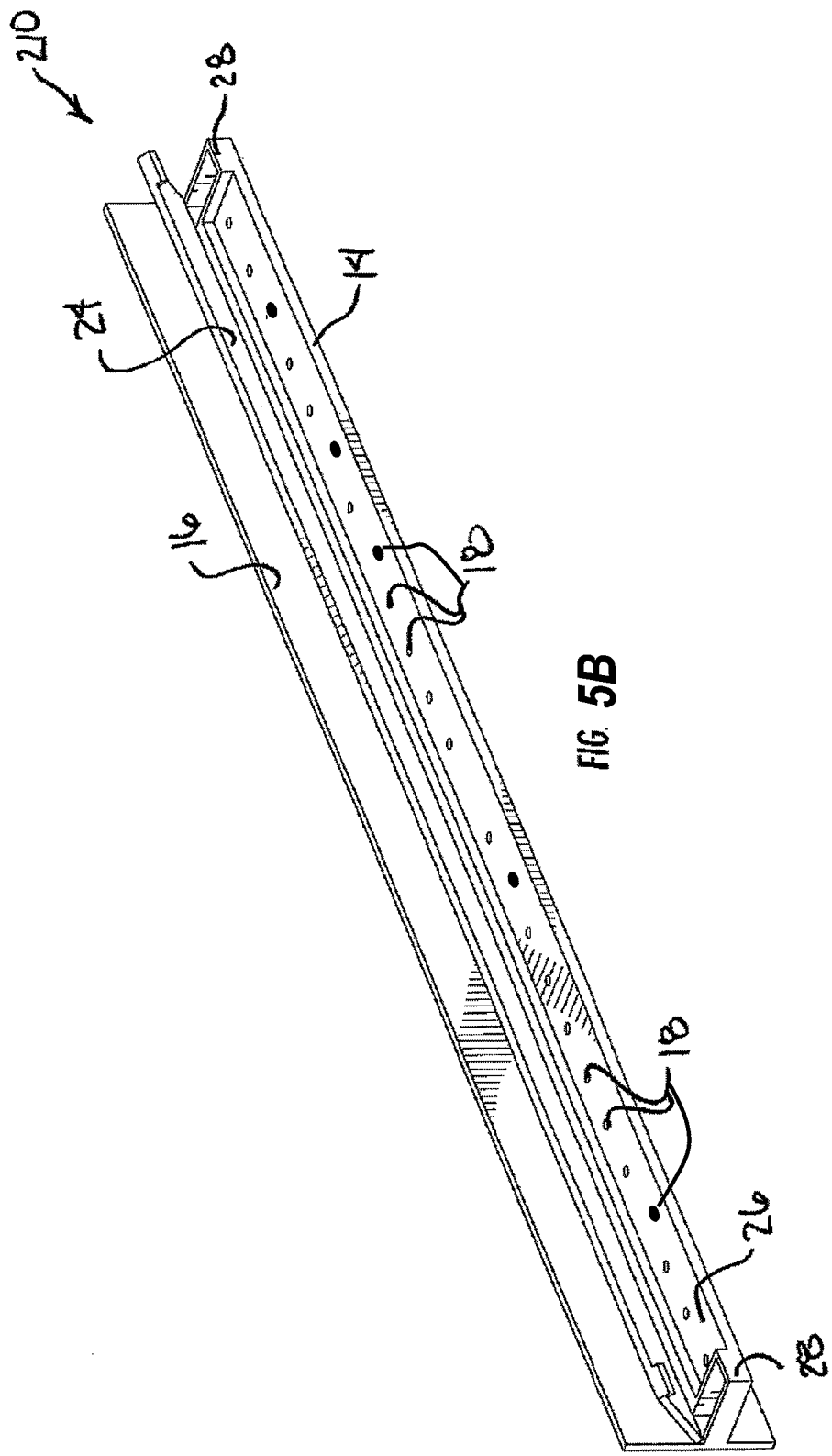

As shown in FIGS. 5-7, another embodiment of the organizer 210 includes a recessed surface 23 without the use of slots/channels. From a manufacturing standpoint, this embodiment may be easier and less expensive to produce. As can be seen, end caps 28 for elongated body 14 are above the surface having holes 18. The end caps 28 each define a female component that both can be engaged by the clip/snap mechanism 26 when the door panel 24 is closed and extend above the recessed surface 23. While FIG. 5A has uniform holes 18, FIG. 5B illustrates an elongated body having holes 18 alternating with different opening sizes and different distances from the front edge to accommodate different hook sizes. Accordingly, when the door panel 24 is closed, a small gap is created between the surface and the door panel 24. The gap should be just large enough to allow hooks within the holes 18 to rise above the surface without impeding the door panel 24. As before, the size of the gap can be customized to accommodate different sizes and types of lures.

Referring now to FIGS. 8-13, the fishing tackle organizing system 12 can be easily understood. The system 12 is comprised of container 30 having a base 32 and a closable lid 34, hinged to the base 32. The base 32 is preferably a relatively deep recessed surface with four outer sidewalls 36. Inner dividers (not shown) may be used for some applications, but an open and empty base, as shown, is preferred.

The lid 34 is attached by hinge(s) to the base 32 to allow movement between an open condition and a closed condition. The lid 34 is comprised of an inner surface 38 and an outer surface 40. The inner surface 38 may include at least one of any of the above-described embodiments of organizer 10/110/210, permanently fixed or detachable from the surface 38. The outer surface 40 of the lid 34 preferably includes a support 42, which retains the lid 34 in an open state and prevents tipping of the container 30. The container 30 may also include a locking/latching mechanism 44 to secure the lid 34 in the closed position and prevent accidental opening.

When fishing tackle is being displayed while in container 30, the open state may create an instability. To address this issue, the support 42 is used to provide stability. The support 42 is illustrated as a pair of pivoting legs 46 which splay and stabilize the open container 30. The pivoting support 42 can be attached in a manner which automatically extends the legs 46 with the opening of the lid 34. Alternatively, the legs 46 may be manually unsecured at one end from the lid 34 and moved to a suitable support position.

Further, such support for the open container 30 can be provided in a number of different ways. For example, while not illustrated, a support may serve to anchor the base 32 to a surface instead of retaining the open lid in a substantially vertical position. This might be accomplished by providing a retractable hook member (not shown), or the like, on the base 32. Alternatively or additionally, a counter weight 50 (FIG. 8) can be used in the base 32 of the container 30.

As previously described, each organizer 10/110/210 may be permanently fixed to the inner surface of the lid 34, but is preferably detachable to allow greater utility. Alternatively, some systems 12 may have both fixed and detachable organizers 10/110/210. Accordingly, detachable organizers 10/110/210 can be fastened within the box 10 by common hook-and-loop material, magnets (e.g., neodymium magnets), snap-fit, or the like. The removable organizer 10/110/210 permits an angler to place the organizer with retained tackle in a more convenient and accessible location while fishing—e.g., a boat deck, fishing pier, etc.—without bringing the entire container 30.

The process of switching out an organizer 10/110/210 would be fairly simple. First, a user would have to determine which organizer 10/110/210 is desired. If the organizer 10/110/210 is of the detachable embodiment, then it can be detached based on the mounting means. Some organizers may include multiple mounting means to allow attachment to different structures, including the inner surface of the container lid. When use of the need only reattach the organizer within the container 10 and remove another shelf of tackle for use.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

The invention claimed is:

1. A compact fishing tackle organizer for placement in a tackle box or attachment to a surface during use, the organizer comprising:
a free-standing body having a predetermined length defined between opposing ends, a horizontal upper surface, and a back surface extending substantially perpendicular from the upper surface, wherein the upper surface includes a plurality of storage sites defined therein, each site comprising an opening through the upper surface, and each opening having both (i) a position at a distance from a front edge of the upper surface, and (ii) a diameter, the distance and the diameter corresponding to a desired fish hook size;
a securing member attached to the upper surface to be movable between an open position and a closed position and configured to cover the plurality of storage sites when in the closed position;
a locking mechanism comprised of first components comprising male components on the securing member which engage complimentary components comprising female components defined on the upper surface of the body at the opposing ends when the securing member is moved to a closed position, and wherein said female components extend above the upper surface of the body; and
an attachment member fixed on the back surface of the free-standing body and configured to detachably connect the free-standing body to a surface to provide access to the plurality of storage sites.

2. The compact fishing organizer of claim 1, wherein the free-standing body is configured to be a size which is capable of fitting into a fishing tackle box.

3. The compact fishing organizer of claim 1, wherein the position of the opening through the upper surface for each of said storage sites is alternately set to correspond to one of at least two different fishing hook sizes.

4. A fishing tackle organizer comprising:
a body having a predetermined length defined between opposing end caps, a recessed horizontal upper surface with a plurality of storage sites defined therein, each site comprising an opening through the upper surface positioned a distance from a front edge of the upper surface corresponding to a desired fish hook size, and a back surface extending substantially perpendicular from the upper surface;
a securing member hinged to one of either the upper surface or the back surface to be movable between an open position and a closed position and configured to cover the plurality of storage sites when in the closed position;
a locking mechanism comprised of first components comprising male components on the securing member which engage complimentary components comprising female components defined on the recessed upper surface of the body at the end caps when the securing member is moved to a closed position, and wherein said female components extend above the recessed upper surface of the body; and
an attachment member fixed on the back surface of the body and configured to detachably connect the body to a surface to provide access to the plurality of storage sites.

5. The fishing tackle organizer of claim 4, wherein the securing member is configured to prevent removal of tackle from the storage sites when in the closed position.

6. The fishing tackle organizer of claim 5, wherein the securing member comprises a hinged lid configured to close over a substantial length of the upper surface.

7. The fishing tackle organizer of claim 6, wherein the recessed horizontal upper surface of the body is recessed to permit the hinged lid to close when the tackle is placed in any of the plurality of storage sites.

8. The fishing tackle organizer of claim 4, wherein the attachment member is selected from the group of mechanisms consisting of magnets, Velcro, clips, snaps, hooks, strap and buckle, and slot and tab.

9. The fishing tackle organizer of claim 4, wherein the distance of the opening through the upper surface for each of said storage sites is alternately set to correspond to one of at least two different fishing hook sizes.

10. The fishing tackle organizer of claim 4, further comprising a channel in the upper surface of the body extending from the opening to the front edge.

\* \* \* \* \*